United States Patent [19]

Joset

[11] Patent Number: 5,003,861
[45] Date of Patent: Apr. 2, 1991

[54] SAFETY DEVICE FOR RELEASABLE CHARGES

[75] Inventor: Gérard Joset, Roissy En Brie, France

[73] Assignee: Thomson-Brandt Armements, Boulogne Billancourt, France

[21] Appl. No.: 461,819

[22] Filed: Jan. 8, 1990

[30] Foreign Application Priority Data

Jan. 20, 1989 [FR] France ................ 89 00684

[51] Int. Cl.$^5$ .............................................. B64D 1/04
[52] U.S. Cl. ...................................... 89/1.55; 89/1.51
[58] Field of Search ................ 89/1.55, 1.51

[56] References Cited

U.S. PATENT DOCUMENTS

| 3,625,106 | 12/1971 | Russo et al. | 89/1.55 |
| 4,322,998 | 4/1982 | Fowler et al. | 89/1.55 |
| 4,440,060 | 4/1984 | Berkley | 89/1.55 |
| 4,520,711 | 6/1985 | Robinson | 89/1.55 |
| 4,867,035 | 9/1989 | Boucard et al. | 89/1.55 |

Primary Examiner—David H. Brown
Attorney, Agent, or Firm—Oblon, Spivak, McClelland, Maier & Neustadt

[57] ABSTRACT

The invention concerns a safety device positioned on a charge releasable from a carrier that, firstly prevents the untimely activation of the charge when this charge is hooked on beneath the carrier and, secondly, makes it possible to know whether any attempt at activation has been made beforehand, in doing so through the display of a position of a sensor of the carrier, forming part of the safety device. The safety device is deployed by means of a cable connected to the carrier. At the moment of release, the cable provided with a knob uses a driving system to drive a sensor which is itself locked by a locking system enabling the display of the position of the sensor and thus releasing the driving system permitting the activation of the charge.

12 Claims, 4 Drawing Sheets

SAFETY DEVICE FOR RELEASABLE CHARGES

BACKGROUND OF THE INVENTION

1. Field of the Invention

The invention concerns the field of charges (or loads) releasable from an aircraft to which they are fixed and, in particular, their safety device to prevent their untimely activation before they are released.

2. Description of the Prior Art

Most releasable charges, notably warheads and submunitions carrier vehicles, require the presence of a number of safety devices which should not be withdrawn except during the charge releasing stage. These safety devices should, firstly, prohibit the charge from being activated through a cable which activates triggering means that permit a firing of the charge or, secondly, prevent the withdrawal of other safety systems capable of triggering the activation of the charge. These safety devices are generally withdrawn by the action of cables, generally called releasable safety devices, one end of which is connected to a device having the function of withdrawing the safety device when a tensile force of a determined value is exerted on the cable, the other end being connected to the aircraft. The tensile force is exerted on the cable by the action of the load during the releasing stage. Safety devices fitted out with a sensor preventing the activation of a charge before its release have been developed and perfected, but their fabrication does not resolve all problems, notably that of knowing whether a cable has been pulled, i.e. whether a safety device has been withdrawn during any handling of the charge, before it has been hooked on beneath an aircraft.

An aim of the invention is to overcome these drawbacks by using a safety device that prevents the untimely activation of the charge before it is released, by means of a presence sensor making it possible, furthermore, to indicate whether an operation has been performed on the cable triggering the activation of the charge through the display of a position of the sensor.

SUMMARY OF THE INVENTION

An object of the invention is a safety device for a charge releasable from a carrier to which it is attached, comprising a cable and a sensor preventing an untimely activation of the charge which, under the effect of a sufficient tensile force exerted on the cable fixed to the carrier, going into the sensor and being provided with a knob located at a determined distance from a stop device placed inside the sensor, is driven by a translational motion limited by the carrier when the charge is placed beneath the carrier, a device wherein the sensor includes locking means enabling a display of a position, after translation, of the sensor.

BRIEF DESCRIPTION OF THE DRAWINGS

Other characteristics and advantages of the present invention will appear from the following description, said description being made with reference to the appended drawings wherein.

DESCRIPTION OF A PREFERRED EMBODIMENT

Figure 1:
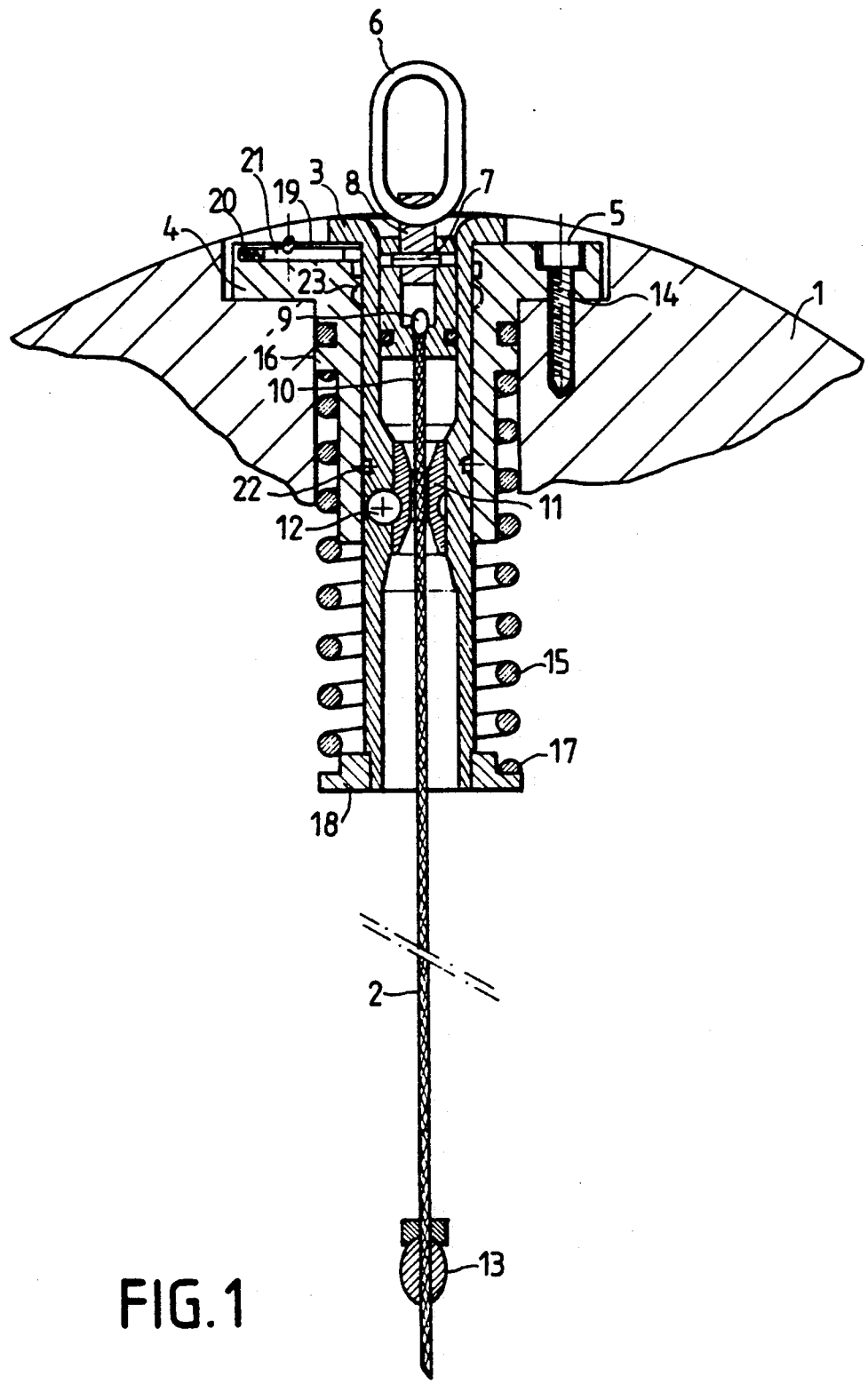
FIG. 1 shows the charge in a stored state provided with the device according to the invention.

FIG. 1 shows a charge 1 in a stored state provided with the safety device according to the invention. This safety device has a presence sensor 3 preventing an untimely activation of the charge. The presence sensor 3 is placed in a supporting gun 4 positioned in a hole 5 made on the surface of the charge through which there emerges a hooking ring 6 fixed, for example by a fuse 7, to an element 8 based within the presence sensor 3. A pulling cable 2 is connected to an element 8 by means of a fixing system, for example a tip 9 in which the end 10 of the pulling cable 2 is fixed. This pulling cable 2 goes into a stop device, for example a lock 11, blocked in its initial position, inside the sensor 3 by means of at least one key 12. An knob 13 is positioned on this cable 2. The defined distance enables an outgoing travel of the cable 2 to hook the ring to the aircraft without the knob's coming into contact with the lock 11. The supporting gun 4 is fixed, for example, to the charge 1 by a screw 14. This gun 4 supports one of the ends of a safety spring 15. The other end 17 of the spring (not compressed in this storage stage) lies on an end 18 of the base of the presence sensor 3. Also within this same gun 4, a locking system 19 is machined. This locking system 19 is constituted, for example, by a spring 20 and by a locking pawl 21 which is translated under the action of the spring 15 when a groove 22, which is rectangular for example, made in the presence sensor 3, faces this locking pawl 21. It is possible to consider positioning this locking system symmetrically by making the appropriate arrangements. The supporting gun 4 also has at least one notch 23 enabling the lock 11 to be released when the key 12, after a vertical translational motion, which is possible only after the charge has been moved away from the aircraft, gets positioned inside this notch 23. To prevent any risk of tearing away due to excessive tensile force, it is possible to make the different locking and fixing systems symmetrically. The layout of all the elements inside the hole 5 provides for efficient imperviousness in storage of the charge 1.

Figure 2:
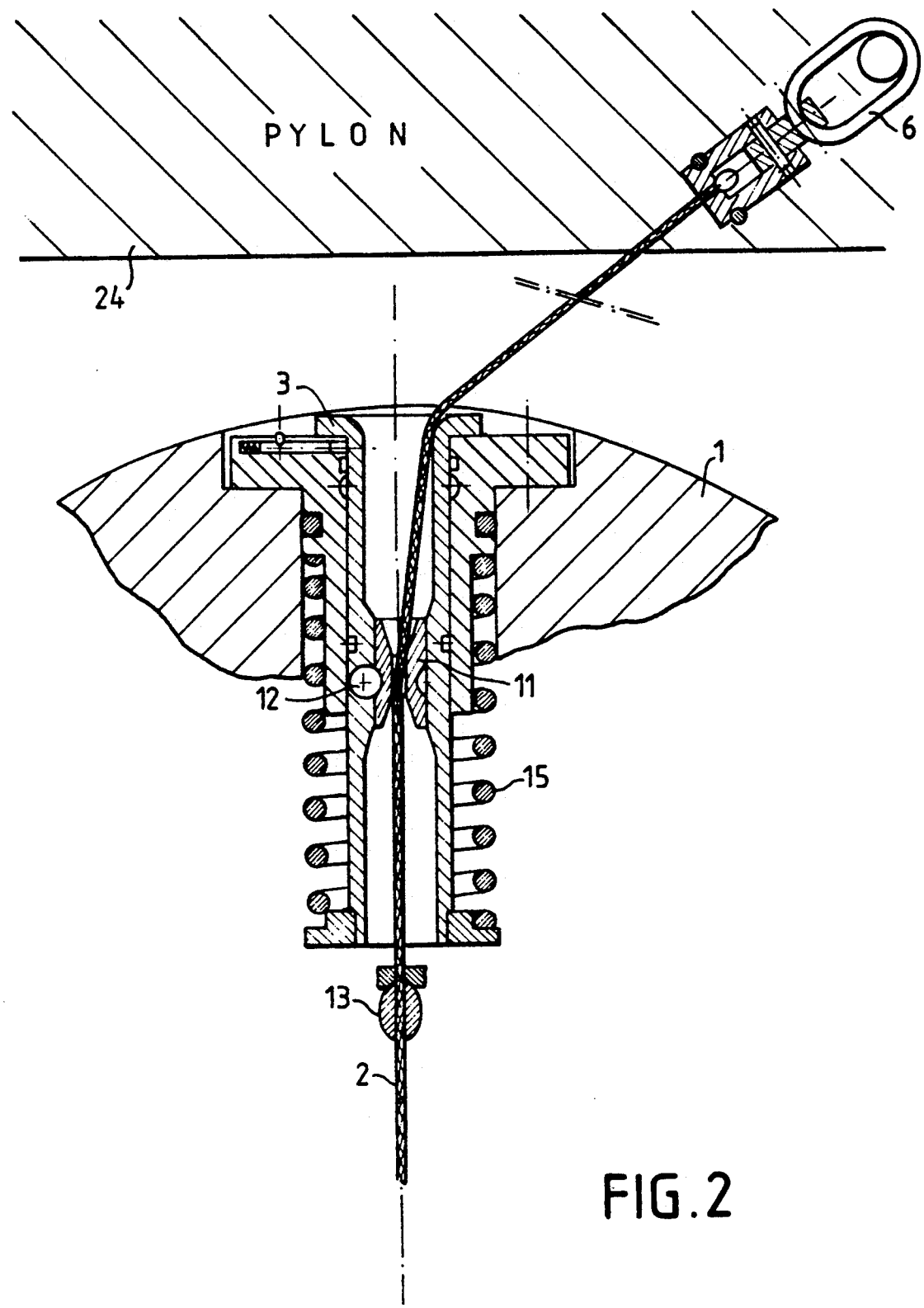
FIG. 2 shows the charge provided with the device according to the invention and hooked on beneath the aircraft.
Figure 3:
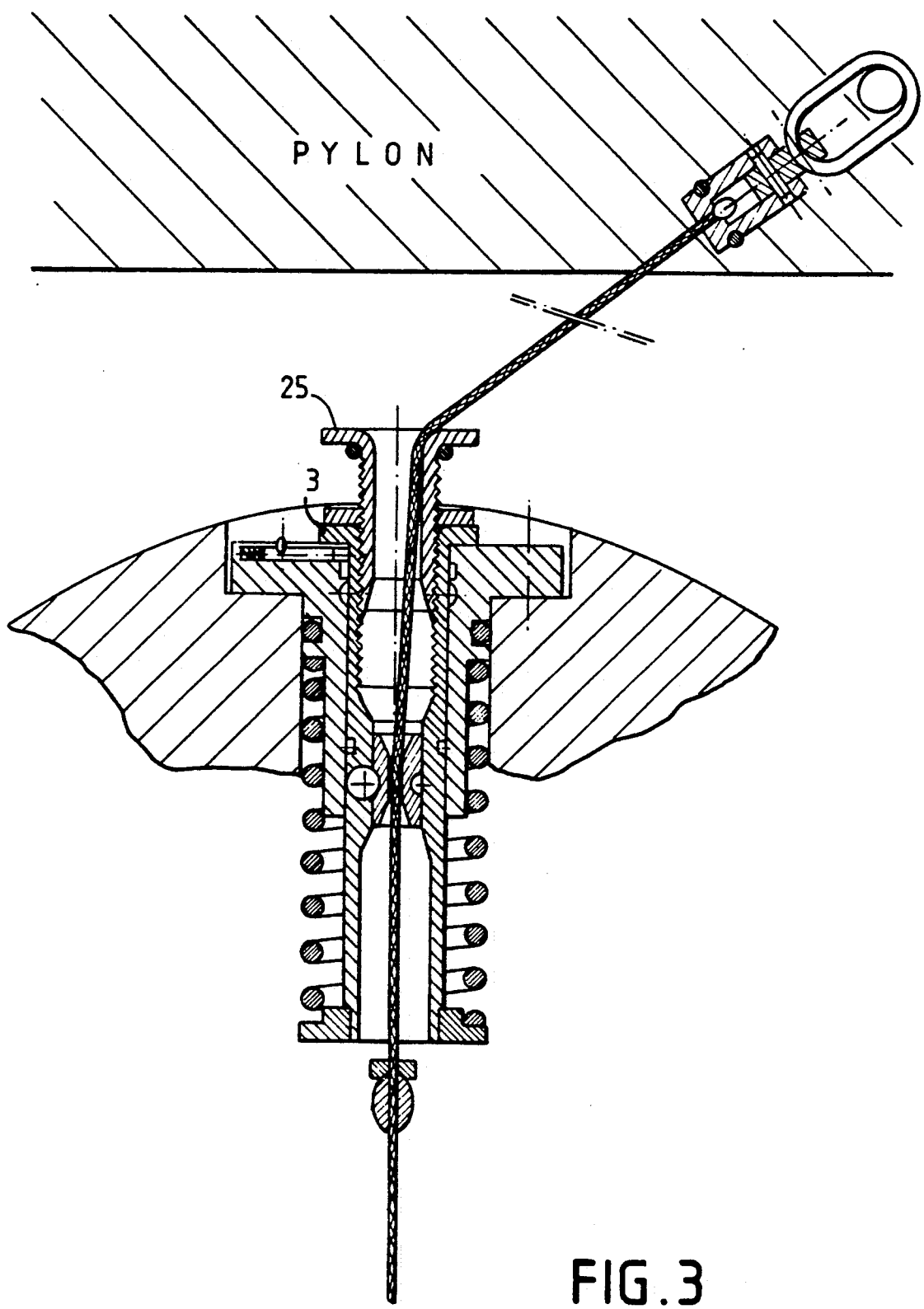
FIG. 3 shows the charge hooked on beneath an aircraft and provided with a second adjustable sensor with which the device according to the invention is fitted out.

FIG. 2 shows the charge 1 hooked on beneath an aircraft and provided with the device according to the invention. The hooking ring 6 positioned, before the application of any tensile force, on the periphery of the charge and inside the presence sensor 3 is hooked on to the aircraft 24. The travel of the cable 2, as mentioned further above, is big enough so that the knob 13 fixed to the cable 2 does not pull the lock 11 during the hooking of the ring. When the ring 6 is fixed, with the movement of the cable 2 continuing, for example under the effect of an external flying object, the knob 13 comes into contact with the lock 11 which, by means of the key 12, drives the presence sensor 3 along in compressing the spring 15. The presence sensor 3 comes out of the charge until, by its external end, it meets a fixed part of the aircraft, and does so when the cable 2 is pulled while the charge is still hooked on to the aircraft. It is seen in this case that the pulling of the cable 2 is limited by the presence sensor 3 coming to a stop against the aircraft. The position of the knob 13 with respect to the lock 11 of the presence sensor 3 and the distance of translation of the presence sensor 3 with respect to the aircraft are designed so that the activation of the charge cannot take place in this case. It is possible to encounter aircraft that do not comply with certain aeronautical standards wherein the distance stipulated for the charges used does not prevent the total movement of the presence sensor 3, thus releasing the lock 11 and thus providing for the travel needed to trigger of the charge firing means. For this reason it is possible, as shown in FIG. 3, to use another adjustable presence sensor 25 which is positioned within the presence sensor 3 by a fixing system, for example a threaded rod and a nut thus enabling the setting of a height determined according to the aircraft concerned.

Figure 4:
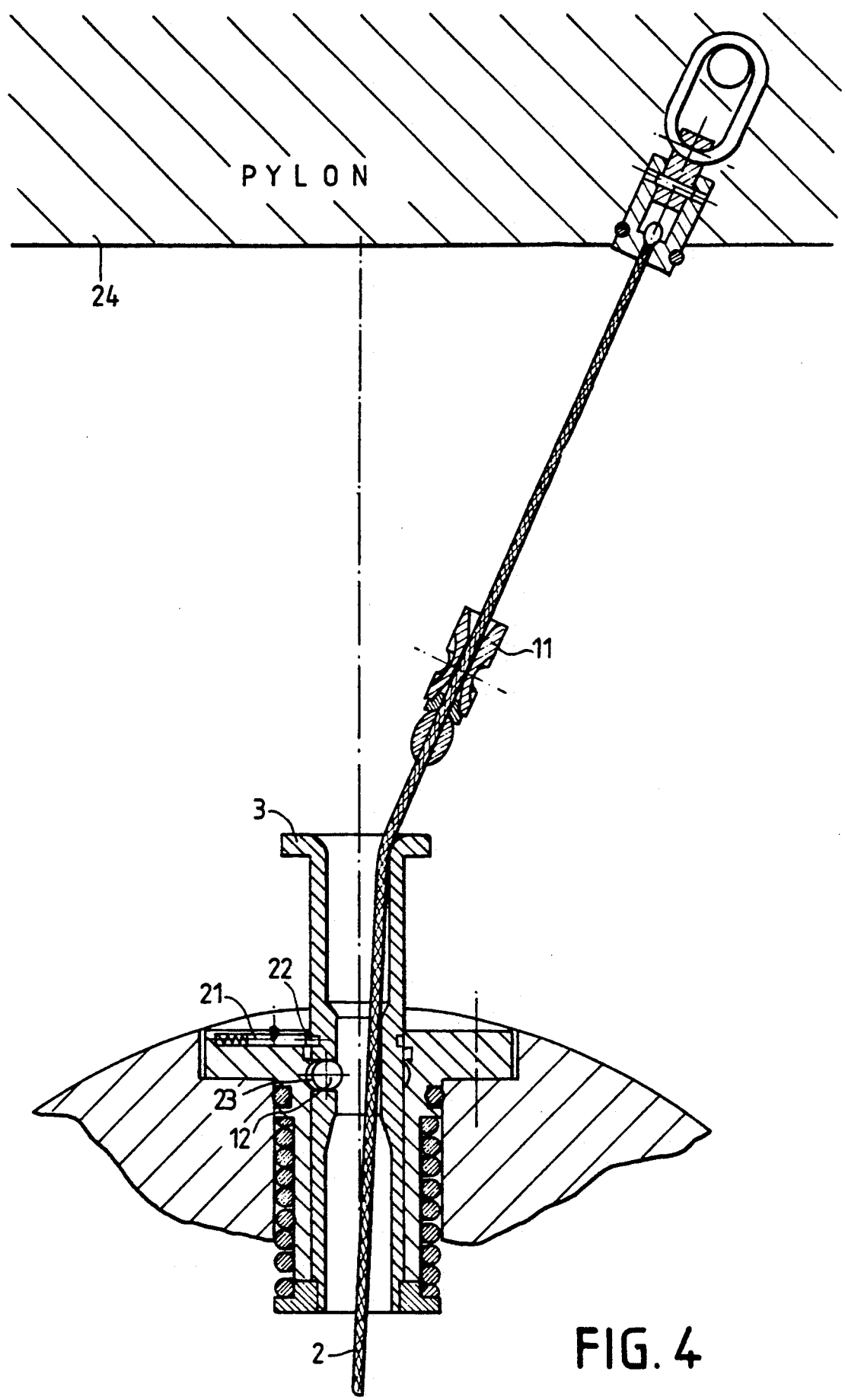
FIG. 4 shows the charge, provided with the device according to the invention, during the releasing stage.

The activation of the fuse before release, when the charge is placed beneath the aircraft, is therefore not possible. It is seen, as shown in the drawing of FIG. 4, that if the aircraft 24 is moved away from the presence sensor 3, as is the case when the charge is released, the presence sensor 3 may continue its translational motion until the locking pawl 21 faces the rectangular groove 22 of the presence sensor 22 of the presence sensor 3. At this same instant, the key 12 escapes into a notch 23, provided for this purpose, and thus releases the lock 11, thus permitting the rest of the travel of the cable 2 making it possible to withdraw, for example, other safety devices or to directly trigger the means for firing the charge 1. The presence sensor 3 is locked and projects from the charge 1. The display of the position of the presence sensor 3, after its translation, makes it possible to arrive at the situation where a tensile force has been exerted on the cable 2, where in relation to the function of this cable, all approaches to or handlings of the charge 1 should be made with extreme caution and, finally, where a charge, the sensor of which of which is in an "outlet locked" position, cannot be hooked on beneath an aircraft.

The present invention can be applied to all releasable charges fitted out with nose fuses and/or base fuses with a view to the withdrawal, for example, of the safety devices of said fuses during release. It is also applicable, inter alia, to all weapon-carrying releasable vehicles, whenever the releasing operation has to activate a function prohibited before the release.

What is claimed is:

1. A safety device for a charge releasable from a carrier comprising:
   a cable;
   a knob fixed on the cable;
   a support in which a presence sensor is positioned;
   a stop device positioned around the cable and initially positioned inside the presence sensor, said knob including a contact surface contactable with said stop device in response to a tensile force on the cable to thereby impart a translational motion to said stop device;
   a locking means for locking the stop device in relation to the presence sensor to transfer translational motion from said stop device to said presence sensor; and
   a locking system for locking the presence sensor in relation with the support when said presence sensor is pulled up outside the support.

2. The safety device according to claim 1, wherein the stop device is a lock having a hole through which the cable passes freely.

3. The safety device according to claim 2, wherein said knob includes a contact surface contactable with a surface on the lock to transfer translational motion to the presence sensor.

4. The safety device according to claim 1, wherein the locking means includes a key mating with a recess in said stop device.

5. The safety device according to claim 4, wherein the device includes a notch means for releasing the key from the recess when said key has translated to a predetermined position, said predetermined position being in alignment with said notch.

6. The safety device according to claim 4, wherein said locking system includes a biased locking pawl or mating with a groove in said presence sensor and locking said presence sensor against translation.

7. The safety device according to claim 6, further comprising a spring for biasing said pawl into a mating relationship with said groove.

8. The safety device according to claim 6, wherein the locking pawl is biased into the groove by the action of the spring in response to pulling said presence sensor out of the support by a predetermined amount.

9. The safety device according to claim 8, further comprising a safety spring which is compressed by an upward movement of the presence sensor.

10. The safety device according to claim 9, further comprising a supporting gun translatably receiving said presence sensor.

11. The safety device of according to claim 10, wherein a hole is provided in said charge, and wherein the supporting gun and the presence sensor are placed in the hole.

12. A safety device for preventing a cable from activating a releasable charge before the releasable charge has been released from a carrier on which the charge is carried, said safety device comprising:
   a stop device engageable with the cable so as to transfer translational movement from the cable to the stop device;
   a presence sensor engageable with said stop device by a releasable key such that said presence sensor translates with said stop device when said releasable key is engaged with the presence sensor; and
   a releasing means for releasing the presence sensor from translating with the stop device when said presence sensor has translated to a predetermined position within the safety device.

* * * * *